No. 854,350. PATENTED MAY 21, 1907.
W. HAUXWELL.
MINING DRILL.
APPLICATION FILED OCT. 30, 1906.
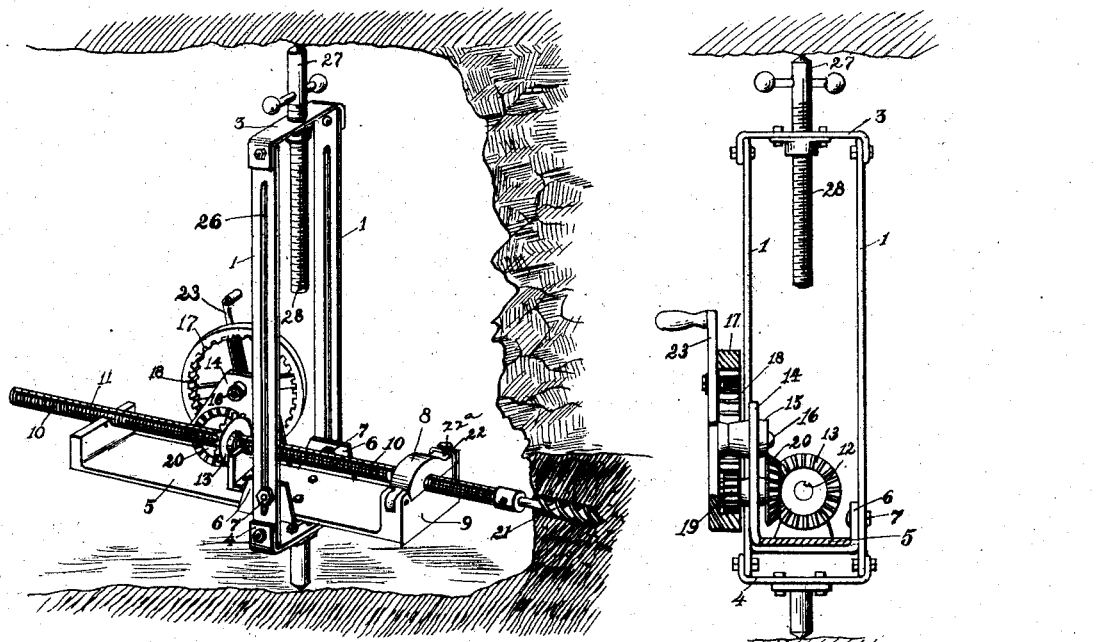
Fig. 1.
Fig. 2.
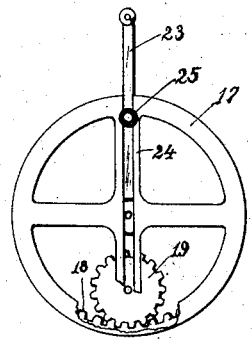
Fig. 4.
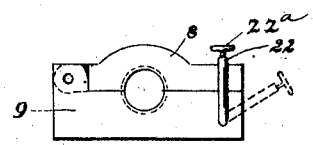
Fig. 3.
Witnesses
Harry O. Rostetter
Sylvia Boron
Inventor.
William Hauxwell.
By F. W. Bond
Attorney

UNITED STATES PATENT OFFICE.

WILLIAM HAUXWELL, OF CANAL FULTON, OHIO.

MINING-DRILL.

No. 854,350.   Specification of Letters Patent.   Patented May 21, 1907.

Application filed October 30, 1906. Serial No. 341,252.

*To all whom it may concern:*

Be it known that I, WILLIAM HAUXWELL, a citizen of the United States, residing at Canal Fulton, in the county of Stark and State of Ohio, have invented certain new and useful Improvements in Mining-Drills; and I do hereby declare that the following is a full, clear, and exact description of the same, reference being had to the accompanying drawings, making a part of this specification, and to the numerals and figures of reference marked thereon, in which—

Figure 1 is a perspective view showing the drill placed in proper position to drill under the vein of coal. Fig. 2 is an end view of the machine, showing the parts properly attached and illustrating the main driving gear and feed screw support in section. Fig. 3 is a detached view of the hinged screw bar bearing. Fig. 4 is a side view of the main driving gear and its pinion parts being broken away.

The present invention has relation to mining drills and it consists in the different parts and combination of parts hereinafter described and particularly pointed out in the claims.

Similar numerals of reference indicate corresponding parts in all the figures of the drawing.

In the accompanying drawing, 1 represents the side members of the frame, which are held in proper spaced relation with reference to each other by means of the top and bottom caps or tie bars 3 and 4, which parts just above mentioned when properly connected together constitute and produce a rectangular frame. To the side members 1 is pivotally and adjustably attached the feed screw support 5 by means of the flanges 6 and the clamping bolts 7, said parts being arranged substantially as shown in Fig. 1. To the front or forward end of the support 5, is attached the hinged cap 8, which cap is seated upon the flange 9 substantially as shown in the drawing. The cap 8 and the flange 9 are each provided with semi-circular grooves which are screw threaded, and when the cap is secured in position said semi-circular screw threaded grooves form a screw threaded aperture through which screw threaded aperture the feed screw passes. The feed screw 10 is provided with the longitudinal groove or way 11, which longitudinal groove or way is for the purpose of receiving the rib 12, which rib is preferably formed integral with the beveled gear wheel 13. The rib 12 is for the purpose of imparting rotary motion to the feed screw 10 when rotary motion is imparted to the beveled gear wheel 13.

It will be understood that by providing the longitudinal groove 11 that the feed screw can be moved forward or longitudinally and its rotary motion maintained during its longitudinal movement by means of the rib 12. The feed screw support 5 is provided with the right angled flange or plate 14, which right angled flange is provided with the lugs or bosses 15, through which lugs and plate is passed the bearing bolt 16, upon which bearing bolt is mounted the main drive or gear wheel 17, which gear wheel is provided with internal teeth 18, which teeth mesh with the pinion 19, said pinion being securely mounted upon a shaft, which is properly journaled in the right angled plate 14, and said shaft provided with the beveled gear wheel 20, which beveled gear wheel meshes with the beveled gear 13.

It will be understood that when the feed screw is rotated in one direction it will be moved longitudinally so as to force the drill 21 into the material designed to be drilled. After the drill has been fed forward the desired distance the hinged cap 8 is released by removing the yoke 22 and the cap turned upon its hinged connection after which the feed screw 10 together with the drill can be removed without rotation. By simply removing the yoke so that it will not engage the free end of the cap 8, said cap is then free to be turned upon its hinged connections, by which arrangement the feed screw is free to be moved endwise without rotation. For the purpose of properly clamping the cap 8 by means of the yoke 22, said yoke is provided with a screw 22ª and when the screw is elevated the yoke will be free to be turned upon its pivotal point. This feature is not within itself new, and I lay no specific claim to the releasing of the feed screw to be withdrawn. In use and especially in mining coal it is frequently necessary to drill under the coal and near the mine floor, and when the crank is attached to the shaft upon which the beveled gear wheel 20 is attached the head or frame which carries the feed drill must necessarily be brought near to the mine floor and the crank which usually is and must of necessity be of considerable length has a tendency to come in contact with the mine floor when brought into its lowermost position, and in order to overcome this objection and difficulty I provide the main gear or drive wheel 17 and elevate said gear wheel above the support 5 and provide said wheel with internal teeth 18 by which arrangement I am enabled to impart rotary motion to the feed screw 10 and at the same time hold the crank 23 in proper elevation.

For the purpose of lengthening and shortening the crank 23 the spoke 24 of the wheel 19 is slotted and the crank 23 adjustably connected in the slot and held in desired adjustment by means of the clamping bolt 25.

It will be understood that I accomplish two purposes by the adjustment of the crank, first to shorten the throw of the crank if necessary and second to increase the length of the crank when room provides, thereby increasing the leverage of the crank.

It will be understood that I am enabled to place the feed screw 10 together with the drill at any desired angle thereby providing a means for drilling under the coal regardless of the angularity of the vein of coal. This is an important feature, owing to the fact that the coal lies in different angles with reference to a horizontal line, and by pivoting the feed screw support 5 it can be adjusted to any angularity to correspond with the angularity of the vein of coal.

For the purpose of changing the position of the support 5 together with the different parts carried thereby in addition to the change of its angularity, the members 1 are provided with the slots 26, which slots permit any vertical adjustment desired between the top and bottom ends of said slots.

It will of course be understood that the frame proper is to be held in proper position between the floor and the top of the mine and in order to provide this, the usual pointed bar 27 having the screw 28 is provided. These parts however are common and are simply shown conventionally.

Having fully described my invention what I claim as new and desire to secure by Letters Patent, is—

In a mining drill, a frame, means for holding the frame in fixed position, a feed screw support pivotally attached to the frame and adjustable vertically between the ends of the frame, a feed screw carried by the support, said support provided with a right-angled plate, a main gear wheel carried by said right-angled plate, a pinion meshing with said gear wheel, and the main gear wheel journaled above the pinion, beveled gear wheels, one of said gear wheels located upon the shaft having a pinion meshing with the main gear wheel, another beveled gear wheel located upon the feed screw and a crank adjustably connected to the main gear wheel, substantially as and for the purpose specified.

In testimony that I claim the above, I have hereunto subscribed my name in the presence of two witnesses.

WILLIAM HAUXWELL.

Witnesses:
THOMAS TEMPLE,
GEO. FELLMETH.